United States Patent [19]

Susor

[11] 4,363,369

[45] Dec. 14, 1982

[54] OVERHEAD TRACK SCALE

[75] Inventor: William C. Susor, Westerville, Ohio

[73] Assignee: Masstron Scale Inc., Columbus, Ohio

[21] Appl. No.: 230,434

[22] Filed: Feb. 2, 1981

[51] Int. Cl.³ .............................................. G01G 19/06
[52] U.S. Cl. .................................... 177/163; 177/211;
   177/DIG. 9; 198/504
[58] Field of Search .......... 177/163, 145, 211, DIG. 9,
   177/52; 198/504; 209/592; 73/862.66

[56] References Cited

U.S. PATENT DOCUMENTS

| | | | |
|---|---|---|---|
| 3,554,025 | 1/1971 | Andersson | 177/211 X |
| 3,669,756 | 6/1972 | Bradley | 177/229 X |
| 3,714,997 | 6/1973 | Ahl et al. | 177/136 |
| 3,734,217 | 5/1973 | Flinth et al. | 177/163 |
| 3,894,592 | 7/1975 | Andersson | 177/163 |
| 4,081,045 | 3/1978 | Harris | 177/163 |

Primary Examiner—Joseph W. Hartary
Attorney, Agent, or Firm—Yount & Tarolli

[57] ABSTRACT

A track scale weighs a load on a track. The scale comprises a live rail for supporting the load to be weighed. A pair of load cells spaced longitudinally of the live rail support the live rail. The load cells have sensing means for sensing shear stresses and providing a signal indicative of the load supported by said load cells. Each of the load cells have a projecting portion extending transverse to the live rail and supporting the live rail. A bearing is interposed between the projecting portion of each load cell and said live rail. The bearing is constructed to allow for movement of the live rail relative to the load cells.

12 Claims, 9 Drawing Figures

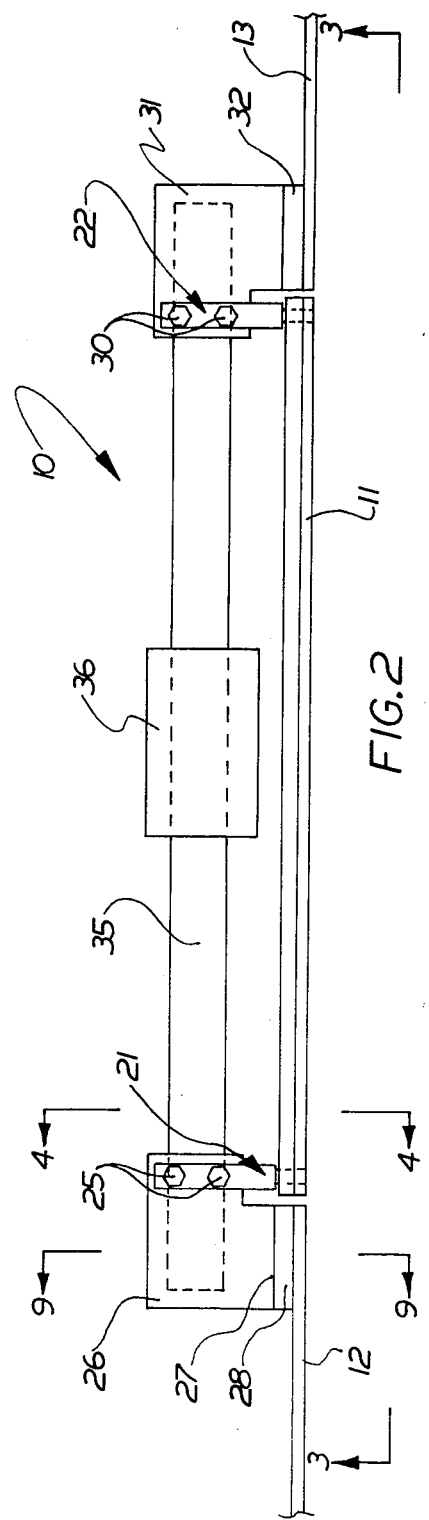
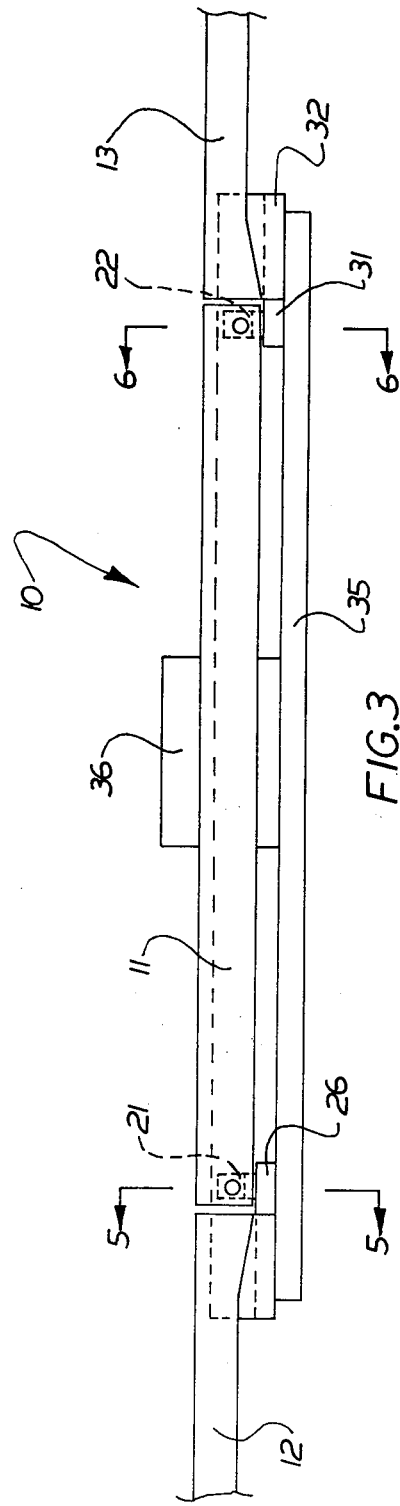
FIG.2
FIG.3

OVERHEAD TRACK SCALE

BACKGROUND AND SUMMARY OF THE INVENTION

The present invention generally relates to devices for weighing an object. The invention specifically relates to an improved overhead track scale.

Overhead track scales have been used in various industries. In the meat industry such scales have been used to weigh beef or pork carcasses for example. Such scales in the past have been suspended from an overhead lever system. In use, the object to be weighed is suspended by a steelyard rod from a scale having a mechanical weighing system with an indicating dial.

In the late 1960's and early 1970's the mechanical weighing system was replaced with an electronic device. In this type of system, a load cell was placed in the steelyard rod and connected to a digital indicator. The weight of the load placed on the steelyard rod was electronically displayed on the digital indicator. In the latter 1970's, the steelyard rod was replaced with a live rail which was hung from tension load cells. The live rail was checked from moving sidewards by steel rods. The steel rods were mounted between the live rail and an adjacent structure.

Track scales also have been used in the railroad industry to measure the weight of railroad cars. Such track scales have used load cells to support a live rail. The load cells have been shear beam load cells which create a signal proportional to the load applied to the load cell. Such have been constructed and operate on the principal that shear beam load cells are not sensitive to a change in the location of the loading point along the length of the shear beam load cells.

However, it is known that, if a variation in the location of the loading point along the length of a shear beam load cells occurs, some change in the indication of the weight measured by the shear beam load cell will occur. Specifically, it is known that approximately a 0.05% change in the weight measured by a shear beam load cell results from approximately a ⅛" change in the location of the loading point along the length of the shear beam load cell. Accordingly it is desirable that the loading point of a shear beam load cell remain fixed along the axial length of the load cell in order to obtain accurate weight measurements.

Also, railroad weighing devices which utilize shear beam load cells for supporting a live rail have been constructed so that the weighing devices can be readily installed in existing systems. Specifically, the construction of the weighing device is such that the installation may be made even though there is some misalignment of certain parts of the system such as the approach rails on opposite ends of the live rail. Typical embodiments of such weighing devices are shown in U.S. Pat. Nos. 3,734,217 and 3,714,997. The weighing devices shown in these patents are constructed so that certain misalignment of parts is compensated for in the installation of the weighing device. Obviously, the advantages of such systems would be desirable in a track scale where the load is applied at the same axial point along the load cell.

The present invention has an elevated live rail mounted between two fixed, elevated approach rails. The invention has the advantage of simple installation even though there is a misalignment of the approach rails. Each end of the live rail is supported by a load cell which extends transverse to the live rail. Each load cell is supported by a respective approach rail. Each load cell includes a gauge block and a circular mounting shaft which extends axially from the gauge block and transverse to the live rail. The mounting shaft is inserted into a hole in the live rail. The holes in each end of the live rail are not the same shape. One of the holes is circular in shape and accepts the circular mounting shaft of one of the load cells. The other hole has an oval shape. Specifically, the other hole is elongated in the direction that the rail extends. Thus, some relative translational movement in the direction of the extent of the live rail can occur between the mounting shaft and the live rail.

Specifically, the oval mounting hole allows the live rail to expand or contract under varying temperatures without side loading the mounting shaft. The imposition of side loads upon the mounting shaft can adversely affect the accuracy of a weight measurement. The oval mounting hole also allows for the installation of the live rail between the approach rails without side loading the load cell even though the distance between the ends of the approach rails and thus the load cells may vary from one installation to another. The oval shaped mounting hole in the live rail can tolerate considerable variance in the distance between the mounting shafts of the load cell.

Also the live rail can pivot about the horizontal axis of the mounting shaft of each load cell. Thus, if there is a vertical misalignment of the approach rails, this vertical misalignment can readily be compensated for due to the fact that the live rail can pivot relative to the load cells at its opposite ends.

Also in accordance with the present invention, if the approach rails are laterally misaligned, the construction of the present invention enables the live rail to be mounted therebetween without changing the location at which the load is applied to the load cell. Moreover, if the load hung from the track scale has a center of gravity offset from the longitudinal axis of the rail, as often is the case, the trolley may tilt or cock the rail about a vertical axis. Thus, the live rail twists which could cause the load to be applied to the load cells at a different axial location along the load cell. However, in accordance with the present invention the load force is still applied to the load cell at the same axial location even if such twisting occurs.

The above advantages are achieved by supporting the live rail by respective bearing assemblies which encircle each mounting shaft and are located in the respective mounting holes in the live rail. The bearing assemblies allow tilting or twisting of the live rail and yet the load applied to the mounting shaft of the load cell still remains perpendicular to the mounting shaft axis and is always at the same axial position along the load cell. Also, the bearing assemblies allow the live rail to pivot about the horizontal axis of the mounting shafts. Further, they allow the approach rails at one end of the live rail to be laterally offset relative to the approach rail at the other end.

BRIEF DESCRIPTION OF THE DRAWINGS

Further features and advantages of the present invention will be apparent to those skilled in the art to which the invention pertains from the following detailed description of a preferred embodiment of the invention made with reference to the accompanying drawings wherein:

FIG. 2 is a top plan view of the scale of FIG. 1 without the trolley and load thereon;

FIG. 3 is a side view of the track scale of FIG. 2;

DETAILED DESCRIPTION OF THE PREFERRED EMBODIMENT

Figure 1:
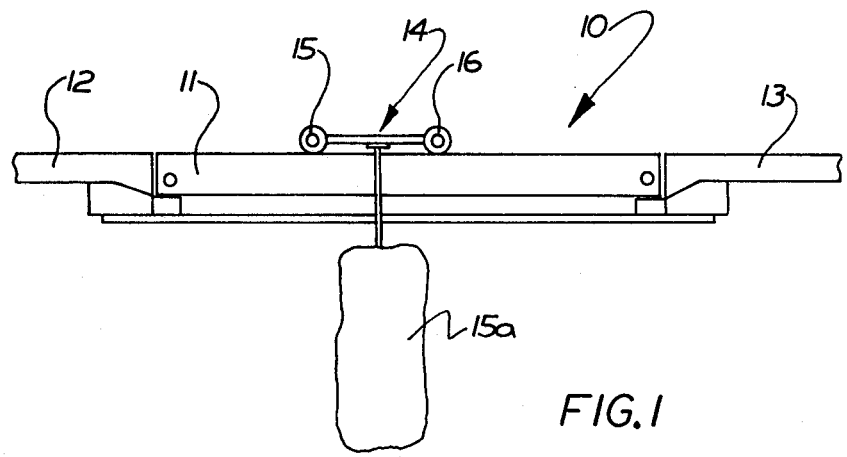
FIG. 1 is a view of an overhead track scale embodying the present invention and having a trolley mounted thereon supporting a load to be weighed.

The present invention relates to a track scale. In particular, the present invention relates to an overhead track scale, in which an article to be weighed hangs from a trolley, or the like, which moves along a track. The specific construction of the present invention may take a variety of forms. As representative of one form of the invention, a track scale 10 is illustrated in the drawings.

As shown in FIG. 1, the track scale 10 includes a live rail 11 interposed between two approach rails 12, 13. A trolley 14 moves along the approach rails 12, 13 and onto and off the live rail 11. The trolley 14 has two wheels 15, 16 which allow the trolley 14 to roll on the rails 11, 12, 13. The trolley 14 carries a weight suspended therefrom, such as a beef or pork carcass 15a, which is to be weighed by the track scale 10. In accordance with the present invention, the live rail 11 can be mounted between the approach rails 12, 13 without the need for perfect alignment of the approach rails 12, 13 with the live rail 11 or each other and without the need for check rods. This will be apparent from the description hereinbelow.

The live rail 11 is supported at its opposite ends by respective load cells 21, 22, see FIGS. 2, 3. The load cell 21 is located at the left end of the live rail 11, as shown in the drawings; whereas the load cell 22 is located at the right end thereof.

The load cell 21 is attached by screws 25 to a load cell support plate 26. The load cell support plate 26 extends generally horizontally and adjacent to the approach rail 12. The end 27 of the support plate 26, which is adjacent to the rail 12, is welded to a connecting block 28, which connecting block 28 in turn is welded to the approach rail 12 (see FIG. 4).

The load cell 22 is secured by bolts 30 to a load cell support plate 31. The load cell support plate 31 is, like the load cell support plate 26, a platelike member which projects generally horizontally and adjacent to the approach rail 13. The end of the load cell support plate 31 which is adjacent to the approach rail 13 is welded to a generally vertically extending connecting block 32. The connecting block 32 is in turn welded to the approach rail 13.

A channel-like connecting member 35 extends parallel to the live rail 11. The connecting member 35 is welded at its opposite ends to the support plates 26, 31, respectively. A suitable enclosure 36 is carried centrally of the support channel 35 and contains the electronics associated with the scale 10.

From the above, it should be apparent that the carcass 15 carried on the trolley 14 can be weighed by merely moving the trolley 14 onto the live rail 11 from one of the approach rails 12, 13. When the weight is located on the live rail 11, the load cells 21, 22 will provide signals indicative of the amount of weight sensed by the respective load cells 21, 22. The signals provided by the load cells 21, 22 are communicated to the electronics in the cabinet 36 and therefrom to a suitable readout device, not shown, for indicating the weight of the load 15 on the trolley 14. The readout device may be a digital or analog readout, as desired.

Figure 4:
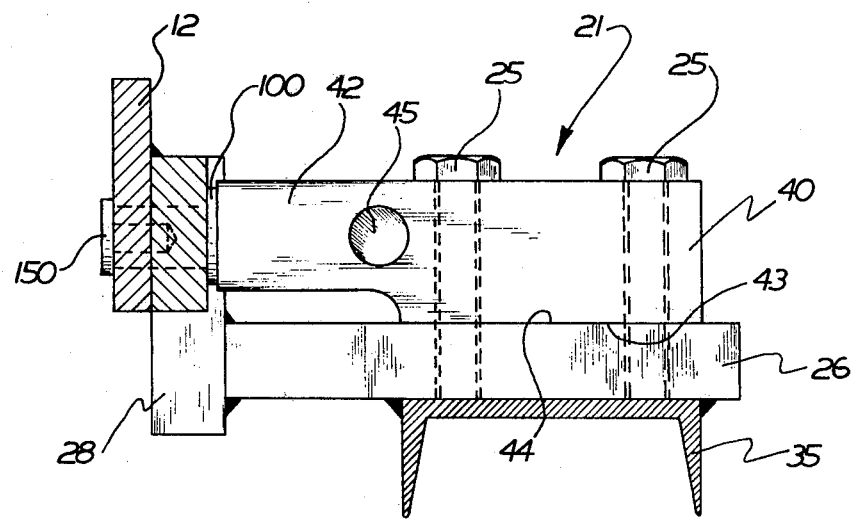
FIG. 4 is a sectional view of the track scale of FIG. 2 taken along line 4—4 of FIG. 2.

The load cells 21, 22 are of identical construction. The load cell 21 is best shown in FIG. 4. The load cell 21 is a shear beam load cell. The load cell has a body portion 40 and a beam portion 42. The beam portion 42 projects outwardly from the body portion 40 and can deflect relative to the body portion 40. The body portion 40 has a surface 43 which engages the upper surface 44 of the load cell support plate 26. The beam portion 42, as shown in FIG. 4, is spaced vertically from the support surface 44 of the plate 26, and can deflect relative to the body portion 40 of the load cell 21. When the beam portion 42 deflects, strain sensing gauges which are carried on the load cell 21 at a recessed location 45 create an electrical signal which is in proportion to the weight on the live rail 11 supported by the load cell.

It is extremely important for purposes of obtaining an accurate weight measurement that the shear strain gauges mounted on the load cells 21, 22 only sense strain indicative of the load carried by the trolley 14. Thus, any other force which tends to create strain in the strain gauge should be avoided.

In accordance with the present invention, the load cells 21, 22 sense only the load carried by the trolley 14. The load cells 21, 22 are not affected by extraneous forces. Specifically, they are not affected by extraneous forces which arise due to misalignment of the various parts of the scale 10 or misalignment of the approach rails 12, 13 to each other or the live rail 11. Also, they are not affected by the carcass being weighed having its center of gravity displaced in such a manner as to tend to tilt the live rail 11, as the center of gravity of the carcass 15 tends to seek a position directly beneath the live rail 11.

The shear beam load cells 21, 22 are isolated from these extraneous forces by the structure interposed between the live rail 11 and the load cells 21, 22. Specifically, the load cell 21 has a projecting shaft portion 50 (see FIG. 5) which is inserted into a mounting hole in the live rail 11. As shown in FIG. 3, the cross section of the portions 40, 42 of the shear beam load cells 21, 22 are rectangular in shape. The shaft portion 50, however, is circular in shape, and projects from the center of the beam portion 42 of the shear beam load cell 21. Specifically, as shown in FIG. 5, the shaft portion 50 projects from the surface 51 of the beam portion 42 of the load cell 21.

Figure 5:
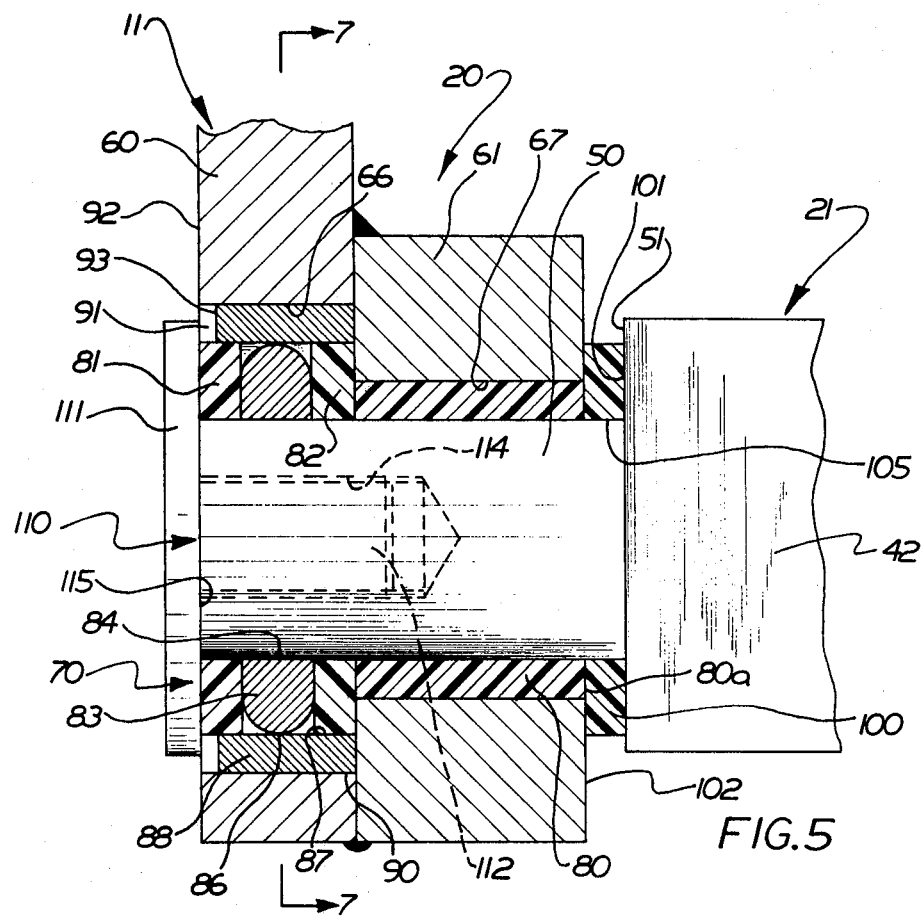
FIG. 5 is a sectional view of the track scale of FIG. 3 taken along line 5—5 of FIG. 3.

As shown in FIG. 5, the shaft portion 50 of the load cell 21 projects outwardly from the load cell beam portion 42 and supports the live rail 11. Specifically, the live rail 11 includes a pair of members 60, 61 which are welded together. One of the members 60 extends vertically above the other member 61. The member 61 reinforces the member 60. The trolley 14 which moves onto the live rail 11 has wheels which roll along the member 60.

A suitable bearing construction, generally designated 70, is interposed between the live rail 11 and the load cell 21. The bearing assembly 70 is located in openings 66, 67 in the rail members 60, 61, respectively. The openings 66, 67 are circular and coaxial.

Specifically, the bearing assembly 70 includes a neoprene sleeve 80 which encircles the shaft portion 50 and is located in the opening 67 in the member 61. The neoprene sleeve 80 supports the shaft 50 so that relative rotation can occur between the shaft 50 and the neoprene sleeve 80. The bearing assembly 70 also includes a pair of circular neoprene spacers 81 and 82. The spacers 81, 82 encircle the shaft 50 and are located in the opening 66 in the rail member 60. Again, relative rotation can occur between the shaft 50 and the neoprene spacers 81, 82. The neoprene spacers 81, 82 are located on opposite axial sides of a stainless steel bearing member 83. The stainless steel bearing member 83 has a circular opening 84 therethrough. The bearing member 84 supports the shaft 50 for relative rotation therebetween.

The outer periphery 86 of the bearing member 83 engages the internal diameter 87 of a stainless steel bearing sleeve 88. The outer periphery 86 of the bearing member 83 in contact with the bearing sleeve 88 is convex as shown in FIG. 5. The outer periphery of the bearing sleeve 88, designated by reference numeral 90, engages the surface defining the opening 66 in the rail member 60. As shown in FIG. 5, the axial extent of the bearing sleeve 88 is less than the axial extent of the surface of the rail member 60 which defines the opening 66. Thus, there is a gap between the outer surface 92 of the rail member 60 and the outer axial surface 93 of the sleeve member 88, as shown in FIG. 5.

Interposed between the member 61 and the load cell beam portion 42 of the load cell 21 is a neoprene spacer 100. The spacer 100 has opposite axial surfaces. One of the axial surfaces engages the beam surface 101. The other axial surface of the spacer 100 engages the surface 102 of the rail portion 61 and an axial end surface 80a of the sleeve 80. The spacer 100 has an opening 105 through which the shaft 50 extends. Relative rotation can occur between the shaft 50 and the spacer 100.

The assembly shown in FIG. 5, including the spacer 100 and the bearing assembly 70, is held together axially by a suitable retaining screw 110. The retaining screw 110 has an end cap portion 111 and a shank portion 112. The shank portion 112 is threaded into a threaded opening located centrally in the shaft portion 50 of the load cell 21. The threaded portions of the opening and shank 112 are shown in dotted lines in FIG. 5 and generally designated 114. As shown in FIG. 5, the inner axial surface 115 of the retaining screw 110 engages the outer axial surface of the neoprene spacer 81. When the assembly is clamped together a gap 91 exists between the inner axial surface 115 of the retaining screw and the axial surface 93 of the bearing sleeve 88. Thus, it should be clear that the bearing sleeve 88 can move axially relative to the retaining screw 110, at least by a dimension equal to the width of the gap 91.

The load cell 22, as noted above, supports the right end of the live rail 20. The load cell 22 has a projecting shaft portion 118 which projects centrally from the surface 12 of the load cell (see FIG. 6). The shaft portion 118 of load cell 22 has a cross section which is circular in shape. The shaft portion 118 projects into openings defined by surfaces 121, 122 in the rail portions 60, 61, respectively. Interposed between the circular shaft 118 and the rail portions 60, 61 is a bearing assembly 70a. The bearing assembly 70a is identical to the bearing assembly 70.

The bearing assembly 70a includes a neoprene sleeve 130 located in the opening 121 and encircling shaft portion 118. Also, similar to the construction shown and described above in connection with FIG. 5, there is a stainless steel bearing member 131 located in the opening 122. The bearing member 131 has an internal surface 132 which engages the outer peripheral surface 133 of a stainless steel bearing member 134. The bearing member 134 engages the outer peripheral surface of the shaft 118 and supports the shaft 118 for relative rotation therein. Neoprene spacer members 140, 141 are located on opposite axial sides of the bearing member 131. Likewise, a spacer 143, like spacer 100 of FIG. 5, is located between the load cell 22 and the rail 61.

Figure 6:
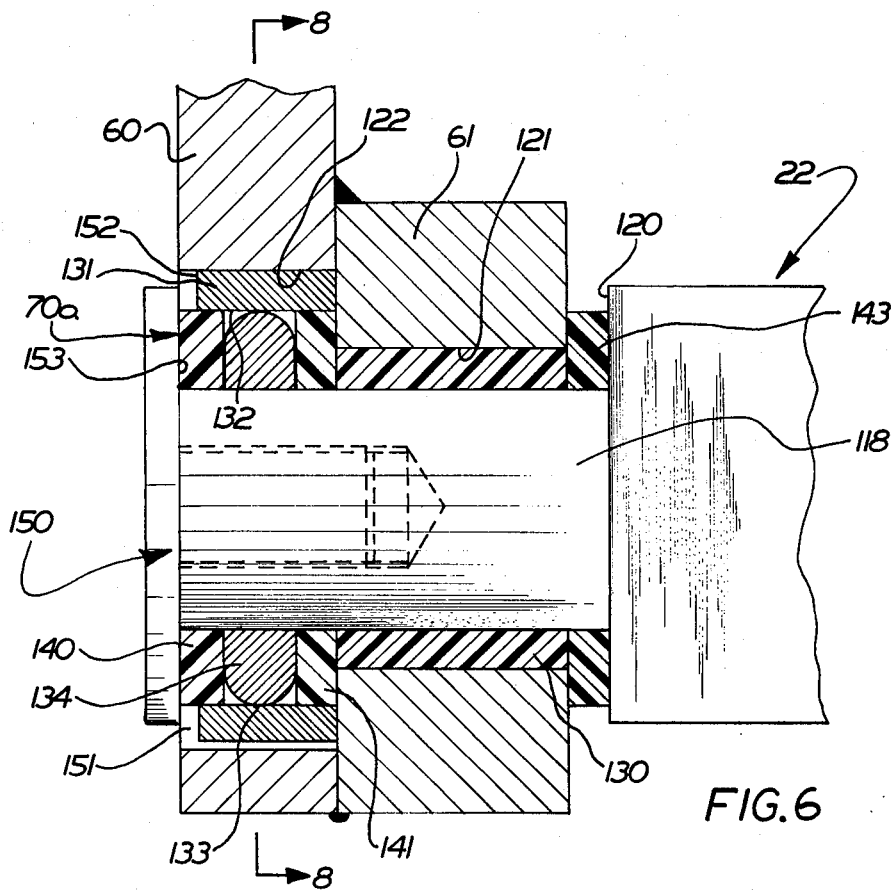
FIG. 6 is a sectional view of the track scale of FIG. 3 taken along line 6—6 of FIG. 3.

The entire assembly shown in FIG. 6 is axially confined by a retaining screw 150 which, like the retaining screw 110, is threaded into a threaded opening located centrally of the shaft 118. A gap 151 is created between the outer axial surface 152 of the sleeve 131 and the inner axial surface 153 of the retaining screw 150. This gap 151, permits some axial movement of the rail members 60, 61 relative to the shaft 118.

From the above, it should be clear that the opposite ends of the rail 20 are supported by the load cells 21, 22, and, specifically, are supported by the shaft portions 50, 118 of the load cells. It should also be clear that some relative movement can occur between the rails 60, 61 and the shaft portions 50, 118 respectively of the load cells. This relative movement can occur both axially, due to the gaps 91, 151, respectively, and rotationally, due to the fact that the bearing constructions permit relative rotation of the rails and the shaft portions 50, 118 of the load cells.

Figure 7:
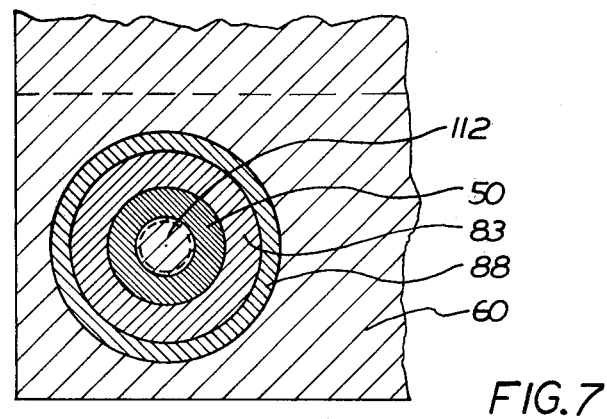
FIG. 7 is a sectional view of the track scale of FIG. 1 taken along line 7—7 of FIG. 5.
Figure 8:
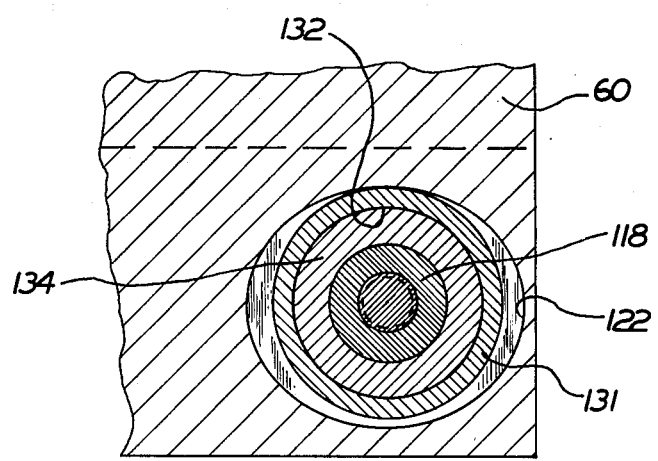
FIG. 8 is a sectional view of the track scale of FIG. 1 taken along line 8—8 of FIG. 6.
Figure 9:
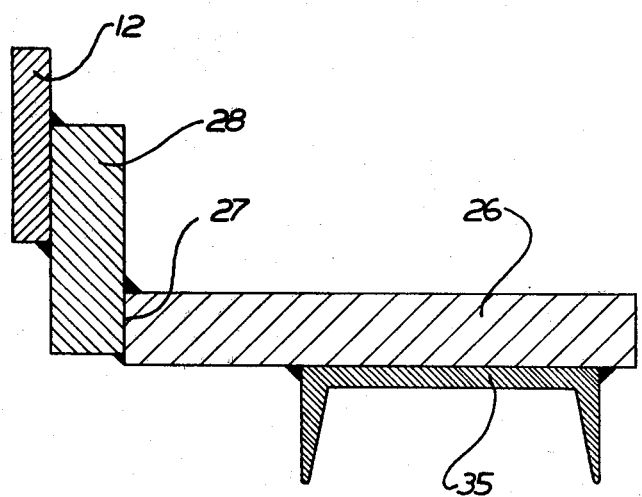
FIG. 9 is a sectional view of the track scale of FIG. 1 taken approximately along the line 9—9 of FIG. 2.

Also, as most clearly shown in FIGS. 7 and 8, the opening 66 in the rail 60, at the left end thereof, is a circular opening. The sleeve 88 is also circular and engages the surface defining opening 66 so that the sleeve 88 cannot move transverse to the axis of the opening. However, the opening defined by surface 121 in the members 60, at the right end of the rail 11 is oval in shape. The opening defined by surface 122 in rail member 61 is circular. This can be seen in FIG. 8. The oval shape allows the rail members 60, 61 to expand or contract or move relative to the load cell 22 in a longitudinal direction, parallel to the extent of the rail 11, without imposing side loads upon the load cells 21, 22. The neoprene sleeve located in the opening defined by surface 122 is resilient and can yield to such movement.

The advantages of the structure described above should be apparent to one skilled in the art. The structure permits ready assembly of the live rail 11 between approach rails 12, 13 without having extraneous forces acting on the load cells 21, 22 even if the rails are not perfectly aligned. Specifically, in the event that the rails 12, 13 are not in perfect vertical alignment, such as by the end of the rail 12 adjacent the live rail being higher than the end of the rail 13 adjacent the live rail, the system can compensate for such a condition without applying any load to either one of the load cells 21, 22. Specifically, the bearing assemblies 70, 70a permit relative rotation of the rail members 60, 61 and the load cell shaft portions 50, 118 about the horizontal axes of the portions 50, 118. Thus, even if the rail 11 is not perfectly horizontal, no side load is applied to the load cells.

Likewise, if one of the rails 12, 13 is offset laterally relative to the other or extend at an angle laterally relative to the other, the bearing assemblies 70, 70a again permit the installation of the scale 10 between the rails 12, 13 without applying any force to the load cells 21, 22, which could affect the accuracy of signals created by those load cells. Specifically, the bearing assemblies 70, 70a because of the gaps 91, 151, permit some axial movement of the rail members 60, 61 relative to the shaft portions 50, 118, respectively. As a result, the live rail 11 may be cocked relative to the axis of the shaft portion 50 or the axis of the shaft portion 118 without interfering with the operation of the scale. This cocking action would merely result in the gap 91 or 151 being lessened and the neoprene sleeve, or spacer 100 or 143 deflecting to absorb the misalignment. It should be clear that there is no load applied to the shear beam load cells 21, 22 due to such lateral misalignment of the rails.

Further, due to the fact that the surfaces 121, 122 define openings which are oval in shape and elongated in the direction of the extent of the rail 11, longitudinal movement of the rail 11 relative to the load cells is permitted without applying any load on the load cells.

In addition to the above, the present invention also insures that the location of the loading point along the axis of the load cells 21, 22 remains the same. It is generally recognized that shear beam load cells provide an accurate signal of a load independently of where the load is applied axially along the shear beam load cell. However, while this generally is true, there are inaccuracies produced by a shear beam load cell when the load is applied at different axial points along the load cell. If extremely accurate readings are desired, it is important that the load be applied to the shear beam load cell at the same axial point along the load cell. Those skilled in the art recognize that a small percentage error is created on the order of 0.005% for each ⅛ of an inch of variance in the axial location of the load applied to a shear beam load cell.

The present invention insures that the axial location of the load applied to the shear beam load cells remains constant. This is due to the fact that, if there is any tendency of the live rail 11 to move axially relative to the shafts 50, 118, this tendency results in axial movement of the sleeve 88 relative to the bearing 83 at the left end of the live rail 11 and/or results in axial movement of the sleeve 131 relative to the bearing 134 on the right end of the live rail 11. No axial movement of the bearings 83, 134 relative to shaft portions 50, 118 occurs. As a result, the load is still applied through the bearings 83, 134, respectively, to the load cells 21, 22, respectively, at the same axial location.

The structure described above also provides for the load to be applied at the same location axially along the load cells 21, 22 even when the center of gravity of the mass 15a which is being weighed causing a tilting or twisting of the rail 11. For example, if the center of gravity of the mass 15 is located to the left of the live rail 11 as shown in FIG. 5, there would be a tendency of the rail 11 to cock. However, this cocking tendency does not result in any change in the location at which the load is applied to the load cell. Specifically, the live rail 11 and the bearing member 88 would pivot on the outer periphery 86 of the bearing member 83 at the left end of the live rail 11. At the right end of the live rail 11, the bearing member 131 and the rail 11 pivot on the peripheral surface 133 of the bearing member 134. However, the load is applied to the load cell at the same axial location along the axis of the load cell.

Obviously, if the center of gravity of the weight is located to the right of the live rail 11 as viewed in FIG. 5, the tilting action would occur in the opposite direction. Again, the load would be applied to the load cells at the same location along the axis of the load cells.

Accordingly, from the above, it should be clear that the present invention provides significant advantages in terms of enabling installation of a track scale to occur even though the approach rails may not be in exact alignment. This can be accomplished without extraneous forces being applied to the load cells 21 and 22. Further, the construction enables the load to be applied axially to the load cells at the same point along the axis of the load cells, irrespective of where the center of the gravity of the load is relative to the live rail. Thus, the scale of the present invention is both easily installed and extremely accurate.

What is claimed is:

1. A track scale for weighing a load on a track, said scale comprising a live rail for supporting said load to be weighed, a pair of load cells spaced longitudinally of said live rail and supporting said live rail, said load cells having sensing means for sensing shear stresses and providing a signal indicative of the load supported by said load cells, each of said load cells having a projecting portion extending transverse to said live rail and supporting said live rail, and means interposed between the projecting portion of each load cell and said live rail for ensuring that the load is applied to said load cell at the same axial position along the length of said load cell and normal to the neutral axis of the load cell.

2. A track scale for weighing a load on a track, said scale comprising a live rail for supporting said load to be weighed, a pair of load cells spaced longitudinally of said live rail and supporting said live rail, said load cells having sensing means for sensing shear stresses and providing a signal indicative of the load supported by said load cells, each of said load cells having a projecting portion extending transverse to said live rail and supporting said live rail, and means interposed between the projecting portion of each load cell and said live rail for ensuring that the load is applied to said load cell at the same axial position along the length of said load cell, said means interposed between said projecting portion of each said load cell and said live rail comprising first and second concentric annular bearing members, said first bearing member slidably and pivotably containing said second bearing member.

3. A track scale as claimed in claim 2 wherein said second bearing member has resilient annular members disposed on both sides thereof and encircling said projecting portions.

4. A track scale for weighing a load on a track, said scale comprising a live rail for supporting said load to be weighed, a pair of load cells spaced longitudinally of said live rail and supporting said live rail, said load cells having sensing means for sensing shear stresses and providing a signal indicative of the load supported by said load cells, each of said load cells having a projecting portion extending transverse to said live rail and supporting said live rail, means interposed between the projecting portion of each load cell and said live rail for ensuring that the load is applied to said load cell at the same axial position along the length of said load cell, said live rail being located between the ends of two approach rails, a support plate attached to each approach rail for supporting said respective load cells, and a connecting member secured to each of said support plates and extending therebetween.

5. A track scale as defined in claim 4 wherein each of said load cells includes a body portion secured to said respective support plate and a beam portion projecting outwardly from said body portion and which may deflect relative to said body portion, said projecting portion extending centrally from said beam portion, said projecting portion being circular in cross section and said beam portion on each load cell being rectangular in cross section.

6. A track scale as defined in claim 5 wherein said live rail comprises two rail members which extend generally coextensively, coaxial circular openings formed in said rail members at one end thereof and receiving said projecting portion of one of said load cells, said means interposed between said projecting portion and said coaxial openings including a neoprene sleeve encircling said projecting portion and located in the opening in one of said members, a pair of circular neoprene spacers, and a bearing member located in the coaxial opening in the other of said rail members and encircling said projecting portion, said bearing member supporting said live rail for movement axially and pivotally thereof, a retaining screw engaged in said projecting portion and engaging the outermost of said neoprene spacers and maintaining said bearing member fixed axially relative to said projecting portion.

7. A track scale as defined in claim 6 further including a neoprene spacer encircling said projecting portion and interposed between said beam portion of said load cell and said live rail.

8. A track scale for weighing a load on a track, said scale comprising a live rail for supporting the load to be weighed and which is to be located between two approach rails, a plurality of shear beam load cells spaced longitudinally of said live rail and extending transverse thereto and supporting said live rail, each of said load cells having a projecting shaft portion extending transverse to said live rail and into an opening in said live rail, and bearing means interposed between each projecting shaft portion and said live rail and located in said openings, said bearing means including means supporting said live rail for rotational movement relative to said shaft portions about the axis of the shaft portions and for movement transverse to the axis of one of said shaft portions.

9. A track scale for weighing a load on a track, said scale comprising a live rail for supporting the load to be weighed and which is to be located between two approach rails, a plurality of shear beam load cells spaced longitudinally of said live rail and extending transverse thereto and supporting said live rail, each of said load cells having a projecting shaft portion extending transverse to said live rail and into an opening in said live rail, and bearing means interposed between each projecting shaft portion and said live rail and located in said openings, said bearing means including means providing for relative rotational movement of said shaft portions and said live rail, one of said openings in said live rail being circular and the other opening being oval and elongated in the direction of the extent of said live rail thereby permitting longitudinal movement of said live rail relative to said load cell.

10. A track scale as defined in claim 9 wherein each bearing means interposed between said shaft portions and said live rail include first and second concentric annular bearing members, said first bearing member slidably and pivotally containing said second bearing member, said second bearing member encircling said shaft portion and said first bearing member encircling said second bearing member and located in the opening in said live rail.

11. A track scale as defined in claim 10 wherein each load cell comprises a base portion and a beam portion extending therefrom, said projecting shaft portion extending from said beam portion, a cross sectional dimension of said beam portion being larger than the cross section of said projecting shaft portion, and a resilient spacer encircling said projecting shaft portion and interposed between said live rail and said beam portion.

12. A track scale as defined in claim 10 further including retaining means for retaining said second bearing means in a fixed axial position on said shaft portion.

* * * * *